United States Patent
Ishizuki et al.

(10) Patent No.: US 6,660,394 B1
(45) Date of Patent: Dec. 9, 2003

(54) COATING COMPOSITION AND HARDENED FILM OBTAINED THEREFROM

(75) Inventors: Kenji Ishizuki, Tokyo (JP); Tatsuya Shimizu, Tokyo (JP); Michiaki Ando, Tokyo (JP); Mibuko Shimada, Tokyo (JP); Hiroshi Shiho, Tokyo (JP)

(73) Assignee: JSR Corporation, Tokyo (JP)

(*) Notice: Subject to any disclaimer, the term of this patent is extended or adjusted under 35 U.S.C. 154(b) by 109 days.

(21) Appl. No.: 09/711,532

(22) Filed: Nov. 14, 2000

(30) Foreign Application Priority Data

Nov. 19, 1999 (JP) .......................... 11-330702

(51) Int. Cl.$^7$ .............................. B32B 27/00
(52) U.S. Cl. ................. 428/447; 525/100; 525/474; 525/476; 525/478; 528/14; 528/28; 528/41
(58) Field of Search .................. 428/447; 524/588, 524/100; 525/474, 476, 478; 528/41, 28

(56) References Cited

U.S. PATENT DOCUMENTS

| | | |
|---|---|---|
| 4,904,721 A | 2/1990 | Hanaoka et al. |
| 5,840,806 A | 11/1998 | Komazaki et al. |
| 6,268,440 B1 | 7/2001 | Kudo et al. |
| 6,287,701 B1 * | 11/2001 | Oochi et al. ................ 428/447 |

FOREIGN PATENT DOCUMENTS

| | | |
|---|---|---|
| EP | 0 806 462 | 11/1997 |
| JP | 60-135465 | 7/1985 |
| JP | 64-001769 | 1/1989 |
| WO | WO 97/00917 | 1/1997 |

OTHER PUBLICATIONS

Abstract, JP11039687, Sep. 5, 2000.
Abstract, WO 98/555548, Dec. 10, 1998.

* cited by examiner

*Primary Examiner*—Robert Dawson
*Assistant Examiner*—Christopher M. Keehan
(74) *Attorney, Agent, or Firm*—Oblon, Spivak, McClelland, Maier & Neustadt, P.C.

(57) ABSTRACT

Disclosed are a coating composition comprising a polymer dispersed in an aqueous medium, the polymer containing (a) a hydrolysate of an organosilane and/or a condensation product thereof and (b) a vinyl polymer containing a silyl group having a silicon atom bound to a hydrolytic group and/or a hydroxyl group, and further comprising (c) an oxazoline derivative as a crosslinking agent and a hardened film obtained therefrom. The above coating composition completes the hardening reaction of a coating film at low temperature for a short period of time, high in hardness immediately after hardening, and having water resistance, weather resistance, organic chemical resistance, acid resistance, alkali resistance, wear resistance and durable adhesion.

17 Claims, No Drawings

COATING COMPOSITION AND HARDENED FILM OBTAINED THEREFROM

FIELD OF THE INVENTION

The present invention relates to a coating composition and a hardened film obtained therefrom, and more particularly to a coating composition excellent in weather resistance and stain resistance, and further excellent in long-term durable adhesion, and a hardened film obtained therefrom.

BACKGROUND OF THE INVENTION

There have been recent demands for coating compositions which are excellent in heat resistance, water resistance, stain resistance, organic chemical resistance, acid resistance, alkali resistance, corrosion resistance, wear resistance, weather resistance, moisture resistance and adhesion, and which are capable of forming coating films high in hardness.

As coating compositions partially satisfying such demands, there are proposed a composition comprising a partial condensation product of an organosilane, a dispersion of colloidal silica and a silicon-modified acrylic resin (see Japanese Patent Application Laid-Open No. 135465/1985), a composition comprising a condensation product of an organosilane, a chelate compound of a zirconium alkoxide and a hydrolytic silyl group-containing vinyl resin (see Japanese Patent Application Laid-Open No. 1769/1989), a composition comprising a condensation product of an organosilane, colloidal alumina and a hydrolytic silyl group-containing vinyl resin (see U.S. Pat. No. 4,904,721), and a composition comprising a hydrolysate of an organosilane, a metal chelate compound and a hydrolytic or partially condensable silyl group-containing vinyl resin.

However, when coating films are formed by use of the coating compositions described in Japanese Patent Application Laid-Open No. 135465/1985 and U.S. Pat. No. 4,904,721, the luster of the coating films is lowered by irradiation of ultraviolet rays for a long period of time.

The composition described in Japanese Patent Application Laid-Open No. 1769/1989, which contains the condensation product of the organosilane, the chelate compound of the zirconium alkoxide and the hydrolytic silyl group-containing vinyl resin in a hydrophilic organic solvent, is insufficient in storage stability, so that an increase in solid content is liable to cause gelation for a short period time.

Further, these compositions are accompanied by hardening reaction in the course of coating film formation. Accordingly, heat treatment at high temperature or for a long period of time is required, which raises problems with regard to practicability. When this heat treatment is conducted under conditions of high temperature and a short time, the resulting coating films are generally liable to become poor in adhesion to substrates or undercoat layers, or insufficient in hardness. In particular, adhesion of foreign matter such as water onto the coating films immediately after formation of the coating films presents the problem of significantly impairing the adhesion of the coating films.

SUMMARY OF THE INVENTION

The present invention has been made in view of the above-mentioned problems in the prior art, and an object of the invention is to provide a coating composition completing the hardening reaction of a coating film at low temperature for a short period of time, high in hardness immediately after hardening, and having water resistance, weather resistance, organic chemical resistance, acid resistance, alkali resistance, wear resistance and durable adhesion.

Another object of the invention is to provide a hardened film obtained therefrom.

The present invention provides a coating composition which is an aqueous dispersion comprising a polymer (hereinafter also referred to as a "specific polymer") containing (a) a hydrolysate of an organosilane represented by the following general formula and/or a condensation product thereof (hereinafter also referred to as "component (a)") and (b) a vinyl polymer (hereinafter also referred to as "component (b)") containing a silyl group having a silicon atom bound to a hydrolytic group and/or a hydroxyl group, and further comprising (c) an oxazoline derivative (hereinafter also referred to as "component (c)") as a crosslinking agent:

$$R^1{}_n Si(OR^2)_{4-n} \qquad (1)$$

wherein $R^1$ represents an organic group having 1 to 8 carbon atoms, $R^2$ represents an alkyl group having 1 to 5 carbon atoms or an acyl group having 1 to 6 carbon atoms, and n is an integer of from 0 to 2.

It is preferred that the above-mentioned coating composition comprises a specific polymer dispersed in an aqueous medium, which polymer contains component (a) and component (b), and further comprises component (c) as a crosslinking agent.

It is preferred that the above-mentioned component (a) is a mixture of a compound represented by general formula $CH_3Si(OR^2)_3$ (wherein $R^2$ has the same meaning as defined above) and a compound represented by general formula $R^1Si(OR^2)_3$ (wherein $R^1$ represents an organic group having 2 to 8 carbon atoms, and $R^2$ has the same meaning as defined above), and the content of the compound represented by $CH_3Si(OR^2)_3$ in the mixture is preferably from 40% to 100% by weight.

It is more preferred that the mixture contains the compound represented by $CH_3Si(OR^2)_3$ in an amount of 50% to 100% by weight.

The above-mentioned component (b) preferably has at least two or more silyl groups at terminals or on side chains of a molecular chain of the vinyl polymer, the silyl groups each having a silicon atom bound to a hydrolytic group and/or a hydroxyl group.

It is preferred that the vinyl polymer containing the Silyl group having a silicon atom bound to a hydrolytic group and/or a hydroxyl group, the above-mentioned component (b), has a functional group that can be chemically bound to a hydrophilic functional group and/or an oxazoline group.

Further, component (c) is preferably a copolymer obtained by emulsion polymerization or suspension polymerization of a copolymerizable oxazoline monomer and another copolymerizable monomer.

The average particle size of the above-mentioned component (c) is preferably from 0.01 μm to 0.5 μm.

Further, the hardened film of the invention is obtained by coating a substrate with the coating composition of the invention and hardening the coating composition.

DETAILED DESCRIPTION OF THE INVENTION

The present invention will be explained in detail.

Coating Composition

Component (a)

Component (a) is a hydrolysate of an organosilane represented by the above-mentioned general formula (1) (hereinafter also referred to as "organosilane (1)") and/or a condensation product thereof.

In the above-mentioned general formula (1), the organic group of 1 to 8 carbon atoms represented by $R^1$ includes, for example, an alkyl group such as methyl, ethyl, n-propyl, i-propyl, n-butyl, i-butyl, sec-butyl, t-butyl, n-pentyl, n-hexyl, n-heptyl or n-octyl; an acyl group such as acetyl, propionyl or butyryl; a γ-chloropropyl group, a γ-bromopropyl group, a 3,3,3-trifluoropropyl group, a γ-glycidoxypropyl group, a γ-(meth)acryloxypropyl group, a γ-mercaptopropyl group, a γ-aminopropyl group, a γ-dimethylaminopropyl group, a 2-(3,4-epoxycyclohexyl) ethyl group, a vinyl group or a phenyl group.

The alkyl group of 1 to 5 carbon atoms represented by $R^2$ includes, for example, a methyl group, an ethyl group, an n-propyl group, an i-propyl group, an n-butyl group, an i-butyl group, a sec-butyl group, a t-butyl group or an n-pentyl group.

Specific examples of such organosilanes (1) include alkoxysilanes such as tetramethoxysilane, tetraethoxysilane, methyl silicate, ethyl silicate, methyltrimethoxysilane, methyltriethoxysilane, n-propyltrimethoxysilane, n-propyltriethoxysilane, i-propyltrimethoxysilane, i-propyltriethoxysilane, γ-chloropropyltrimethoxysilane, γ-chloropropyltriethoxysilane, 3,3,3-trifluoropropyl-methoxysilane, 3,3,3-trifluoropropyltriethoxysilane, γ-glycidoxypropyltrimethoxysilane, γ-glycidoxypropyltri-ethoxysilane; γ-methacryloxypropyltrimethoxysilane, γ-methacryloxypropyltriethoxysilane, γ-mercapto-propyltrimethoxysilane, γ-mercaptopropyltriethoxysilane, 3,4-epoxycyclohexylethyltrimethoxysilane, 3,4-epoxy-cyclohexylethyltriethoxysilane, vinyltrimethoxysilane, vinyltriethoxysilane, phenyltrimethoxysilane, phenyltriethoxysilane, ureidopropyltrimethoxysilane, mercaptopropyltrimethoxysilane, aminopropyl-trimethoxysilane, ether-modified alkyltrimethoxysilanes, aminoethylaminopropyltrimethoxysilane, aminopropyl-methyldimethoxysilane, aminopropyltriethoxysilane, aminoethylaminopropylmethyldimethoxysilane, dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, divinyldimethoxysilane, divinyldiethoxysilane, diphe-nyldimethoxysilane and diphenyldiethoxysilane; and acy-loxysilanes such as tetracethoxysilane, methyltriacethoxy-silane, ethyltriacethoxysilane, dimethyldiacethoxysilane, and diethyldiacethoxysilane. Preferred are methyl-trimethoxysilane, methyltriethoxysilane, dimeth-yldimethoxysilane and dimethyldiethoxysilane.

These organosilanes (1) may be used alone or as a mixture of two or more of them.

In the invention, organosilane (1) is used as it is or as a hydrolysate and/or a condensation product. Here, the hydrolysate of organosilane (1) does not require that $OR^2$ groups contained in organosilane (1) are all hydrolyzed. One in which only one group is hydrolyzed, one in which two or more groups are hydrolyzed, or a mixture thereof may be used. Further, in the above-mentioned condensation product of organosilane (1), silanol groups of the hydrolysate of organosilane (1) are condensed to form an Si—O—Si bond. In the invention, however, it is not necessary that the silanol groups are all condensed. The concept of the condensation product of organosilane (1) used in the invention include one in which the silanol groups are only partly condensed and a mixture of ones different in the degree of condensation. In this case, when the specific polymer is manufactured, the condensation reaction of organosilane (1) with the vinyl polymer described later occurs while forming a polyorga-nosilaoxane chain by the polycondensation reaction of orga-nosilane (1), which allows the polyorganosilaoxane chain to chemically combine with the vinyl polymer. The condensation product of organosilane (1) includes, for example, a condensation product of methyltrimethoxysilane (preferably a pentamer to an eicosamer, Mw=500 to 5,000).

The above-mentioned components (a) can be used either alone or as a mixture of two or more of them.

The weight average molecular weight converted to poly-styrene (hereinafter referred to as "Mw") of the above-mentioned condensation product of organosilane (1) is generally from 500 to 100,000, preferably from 500 to 50,000, and more preferably from 500 to 5,000.

Silyl Group-Containing Vinyl Polymer (b)

The silyl group-containing vinyl polymer, component (b), is a polymer having a principal chain composed of a vinyl polymer, the molecular chain of the polymer having at least one, preferably two or more hydrolytic silyl groups and/or hydroxysilyl groups (these groups are hereinafter correc-tively referred to as a "hydrolytic silyl group, etc.") at terminals or on side chains thereof (such a polymer is hereinafter also referred to as "vinyl polymer (b)"). Vinyl polymer (b) is preferably a polymer having at least one, preferably two or more hydrophilic functional groups and at least one, preferably two or more functional groups each of which can be bound to an oxazoline group contained in component (c) (such a functional group is hereinafter also referred to as a "reactive functional group"). When the above-mentioned hydrophilic functional group is reactable with the oxazoline group, for example, a carboxyl group, a hydroxyl group, an amino group or a glycidyl group, the polymer has a preferred performance without the above-mentioned reactive functional group.

The hydrolytic silyl group, etc. in vinyl polymer (b) are generally represented by the following general formula (2):

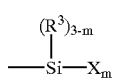

wherein
X represents a hydrolytic group such as a halogen atom, an alkoxy group, an acyloxy group, a phenoxy group, a thioalkoxy group, an amino group or an acetoxy group, or a hydroxyl group;
$R_3$ represents a hydrogen atom, an alkyl group having from 1 to 10 carbon atoms or an aralkyl group having from 1 to 10 carbon atoms; and m denotes an integer of from 1 to 3.

At least one hydrolytic silyl group, etc. can exist in vinyl polymer (b).

The hydrophilic functional groups in vinyl polymer (b) include a carboxyl group, a carboxylic acid anhydride, a hydroxyl group, an amino group, an amido group, an ami-neimido group and a glycidyl group. Though one or more of these hydrophilic functional groups can exist in vinyl poly-mer (b), it is preferred that two or more of any of, for example, a carboxylic group, a hydroxyl group, amineimido group and a glycidyl group coexist. The reactive functional groups in vinyl polymer (b) include a carboxyl group, a hydroxyl group, an amino group, a thiol group, an epoxy group, a glycidyl group and a sulfine group, and particularly preferred is a carboxyl group.

Vinyl polymer (b) can be produced, for example, by (i) a method in which a hydrosilane compound having a hydro-lytic silyl group is added to a carbon-carbon double bond of a vinyl polymer having the carbon-carbon double bond and a hydrophilic functional group (such a vinyl polymer is hereinafter referred to as a "functional unsaturated polymer") or (ii) a method of copolymerizing a hydrolytic silyl group-containing vinyl monomer and a hydrophilic functional group-containing vinyl monomer.

The functional unsaturated polymer used in the method of (i) can be produced, for example, by the following methods.

That is to say, the functional unsaturated polymer having a carbon-carbon double bond on a side chain of a polymer molecular chain can be produced by (i-1) a method in which a vinyl monomer having a hydrophilic functional group is (co)polymerized optionally with another vinyl monomer to synthesize a precursor of a (co)polymer, and then an appropriate functional group (hereinafter referred to as a "complementary functional group (a)") contained in the precursor of the (co)polymer is reacted with an unsaturated compound having a functional group (hereinafter referred to as a "complementary functional group (β)") capable of reacting with functional group (a) and also having a carbon-carbon double bond.

The functional unsaturated polymer having a carbon-carbon double bond at one terminal of a molecular chain of the polymer or having carbon-carbon bonds at both terminals thereof can be manufactured by (i-2) a method of polymerizing a hydrophilic functional group-containing vinyl monomer, or optionally copolymerizing this vinyl monomer with another vinyl monomer copolymerizable with this vinyl monomer, using a complementary functional group (α)-containing radical polymerization initiator (for example, 4,4-azobis-4-cyanovaleric acid), or using complementary functional group (α)-containing compounds as both the radical polymerization initiator and a chain transfer agent (for example, 4,4-azobis-4-cyanovaleric acid and dithioglycolic acid), to synthesize a precursor of the (co) polymer having complementary functional group (α) derived from the radical polymerization initiator or the chain transfer agent at one or both terminals of the molecular chain of the polymer, and then, reacting an unsaturated compound having complementary functional group (β) and a carbon-carbon double bond with complementary functional group (α) contained in the precursor of the (co) polymer.

In addition, the functional unsaturated polymer can also be manufactured by (i-3) a combination of (i-1) and (i-2) described above.

Examples of the reactions of complementary functional group (α) with complementary functional group (β) in the methods of (i-1) and (i-2) include an esterification reaction of a carboxyl group with a hydroxyl group, a ring-opening esterification reaction of a carboxylic acid anhydride group with a hydroxyl group, an esterification reaction of a carboxyl group with an epoxy group, an amidation reaction of a carboxyl group with an amino group, a ring-opening amidation reaction of a carboxylic acid anhydride group with an amino group, a ring-opening addition reaction of an epoxy group with an amino group, and a urethanization reaction of a hydroxyl group with an isocyanate group.

Examples of the vinyl monomers having the above-mentioned hydrophilic functional groups include carboxyl group-containing unsaturated compounds such as (meth) acrylic acid, crotonic acid, cinnamic acid, maleic acid, fumaric acid, itaconic acid, monomethyl maleate, monoethyl maleate, mono-methyl itaconate, monoethyl itaconate and mono-2-(meth)acryloyloxyethyl hexahydrophthalate; unsaturated carboxylic acid anhydrides such as maleic acid anhydride and itaconic acid anhydride; hydroxyl group-containing vinyl monomers such as 2-hydroxylmethyl (meth)acrylate, 2-hydroxyethyl(meth)-acrylate, 2-hydroxypropyl(meth)acrylate, 3-hydroxypropyl(meth) acrylate, 2-hydroxybutyl(meth)acrylate, 3-hydroxybutyl (meth)acrylate, 4-hydroxybutyl(meth)acrylate, 5-hydroxyamyl(meth)acrylate, 6-hydroxyhexyl(meth) acrylate, 4-hydroxycyclohexyl(meth)acrylate, neopentyl glycol mono (meth)acrylate, 3-chloro-2-hydroxypropyl (meth)acrylate, 3-amino-2-hydroxypropyl(meth)acrylate, glycine mono- or di-(meth)acrylate, trimethylolpropane mono- or di-(meth) acrylate, pentaerythritol mono- or di- (meth)acrylate, N-methylol (meth)acrylamide, N,N-dimethylol(meth)acrylamide, 2-hydroxyethyl vinyl ether, 2-hydroxypropyl vinyl ether and 3-hydroxypropyl vinyl ether; amino group-containing vinyl monomers an such as 2-aminoethyl(meth)acrylate, 2-aminopropyl (meth)acrylate, 3-aminopropyl(meth)acrylate, 2-dimethylaminoethyl(meth) acrylate, 2-diethylaminoethyl(meth)-acrylate, 2-dimethylaminopropyl(meth)acrylate, 3-dimethylaminopropyl (meth)acrylate, 2-aminoethyl vinyl ether, N,N-dimethylamino(meth)acrylamide and N,N-diethylamino(meth)-acrylamide; amido group-containing vinyl monomers such as acrylamide, diacetoneacrylamide, maleic acid diamide, fumaric acid diamide, itaconic acid diamide, α-ethylacrylamide and N-butoxymethyl(meth) acrylamide; amineimido group-containing vinyl monomers such as 1,1,1-trimethylamine(meth)acrylimide, 1-methyl-1-ethylamine(meth)acrylimide, 1,1-dimethyl-1-(2'-hydroxypropyl)amine(meth)acrylimide, 1,1-dimethyl-1-(2'-phenyl-2'-hydroxyethyl)amine(meth)acrylimide, and 1,1-dimethyl-1-(2'-hydroxy-2'-phenoxypropyl)amine(meth) acrylimide; glycidyl group-containing vinyl monomers such as allyl glycidyl ether, glycidyl(meth)acrylate and methylglycidyl (meth)acrylate; epoxy group-containing vinyl monomers such as epoxidated cyclohexyl(meth)acrylate; and vinyl ester monomers such as vinyl acetate, vinyl propionate and vinyl versatate. These vinyl monomers can be used either alone or as a mixture of two or more of them.

Of the above-mentioned hydrophilic functional group-containing vinyl monomers, (meth)acrylic acid is especially preferred in the group consisting of the unsaturated carboxylic acids and the unsaturated carboxylic acid anhydrides, and 2-hydroxyethyl(meth) acrylate is particularly preferred as the hydroxyl group-containing vinyl monomer. In the group consisting of the amino group-containing vinyl monomers and the amineimido group-containing vinyl monomers, 1,1, 1-trimethylamine(meth)acrylimide, 1,1-dimethyl-1-(2-hydroxypropyl)amine(meth)acrylimide, 1,1-dimethyl-1-(2'-phenyl-2'-hydroxyethyl)amine(meth)acrylimide, and 1,1-dimethyl-1-(2'-hydroxy-2'-phenoxypropyl)amine(meth) acrylimide are particularly preferred.

The other vinyl monomers to be copolymerized with the hydrophilic functional group-containing vinyl monomers include, for example, (meth)acrylates such as methyl(meth) acrylate, ethyl(meth)acrylate, n-propyl(meth)acrylate, i-propyl(meth)acrylate, n-butyl(meth)acrylate, t-butyl(meth) acrylate, 2-ethylhexyl(meth)acrylate and cyclohexyl(meth) acrylate; carbonyl group-containing vinyl monomers such as (meth)acrolein, croton aldehyde, formylstyrene, formyl-α-methylstyrene, diacetoneacrylamide, (meth)acrylamide pivalin aldehyde, 3-(meth)acrylamidemethylanisaldehyde, β-(meth)acryloxy-α, α-dimethylpropanal (that is, β-(meth)-acryloxypivalinaldehyde), β-(meth)acryloxy-α, α-diethylpropanal, β-(meth)acryloxy-α, α-dipropylpropanal, β-(meth)-acryloxy-α-methyl-α-butylpropanal, β-(meth)acryloxy-α, α,β-trimethylpropanal, diacetone(meth)acrylamide, a vinyl alkyl ketone having from 4 to 7 carbon atoms (for example, vinyl methyl ketone, vinyl ethyl ketone, vinyl n-propyl ketone, vinyl i-propyl ketone, vinyl n-butyl ketone, vinyl i-butyl ketone or vinyl t-butyl ketone), vinyl phenyl ketone, vinyl benzyl ketone, divinyl ketone, diacetone(meth)acrylate, acetonitrile (meth) acrylate, 2-hydroxypropyl(meth)acrylate-acetyl acetate, 3-hydroxypropyl(meth)acrylate-acetyl acetate, 2-hydroxybutyl(meth)acrylate-acetyl acetate, 3-hydroxybutyl(meth)acrylate-acetyl acetate, 4-hydroxybutyl(meth)-acrylate-acetyl acetate and butanediol-1,4(meth)acrylate-acetyl acetate; piperidine unsaturated monomers having UV stability such as 4-(meth) acryloyloxy-2,2,6,6-tetramethylpiperidine, 4-(meth) acryloylamino-2,2,6,6-tetramethylpiperidine, 4-(meth) acryloyloxy-1,2,2,6,6-pentamethylpiperidine and 4-(meth) acryloylamino-1,2,2,6,6-pentamethylpiperidine; (meth) acrylonitrile; styrene; α-methylstyrene; vinyl chloride; vinyl acetate; and vinyl propionate. These vinyl monomers can be used either alone or as a mixture of two or more of them.

The above-mentioned carbonyl group-containing vinyl monomer reacts with component (g) described later to form a network structure. In this case, the carbonyl group-containing vinyl monomer is preferably contained in an amount of 0.5 part to 30 parts by weight in the composition.

Examples of the unsaturated compounds each having complementary functional group (β) and a carbon-carbon double bond include epoxy group-containing unsaturated compounds such as glycidyl(meth)acrylate and allyl glycidyl ether, and isocyanate group-containing unsaturated compounds obtained by reacting the above-mentioned hydroxyl group-containing vinyl monomers with equimolar diisocyanate compounds, as well as the unsaturated carboxylic acids, the unsaturated carboxylic acid anhydrides, the hydroxyl group-containing vinyl monomers and the amino group-containing vinyl monomers of the above-mentioned hydrophilic functional group-containing vinyl monomers.

Examples of the hydrolytic group-containing hydrosilane compounds, which are used in the method of (i), include halogenated silanes such as methyldichlorosilane, phenyldichlorosilane and trichlorosilane; alkoxy silanes such as methyldimethoxysilane, methyldiethoxysilane, phenyldimethoxysilane, trimethoxysilane and triethoxysilane; acyloxysilanes such as methyldiacetoxysilane, phenyldiacetoxysilane and triacetoxysilane; aminoxysilanes such as dimethylaminoxysilane, methyldiaminoxysilane and triaminoxysilane; phenoxysilanes such as methyldiphenoxysilane and triphenoxysilane; thioalkoxysilanes such as methyl-di(thiomethoxy)silane and tri(thiomethoxy)silane; and aminosilanes such as methyldiaminosilane and triaminosilane. These hydrosilane compounds can be used either alone or as a mixture of two or more of them.

Next, the hydrolytic silyl group-containing vinyl monomers used in the method of (ii) described above are represented by the following general formula (3):

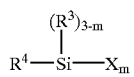

(3)

wherein X, $R^3$ and m each have the same meanings as defined in general formula (2) and $R^4$ represents an organic group having a polymerizable carbon-carbon double bond.

Specific examples of such hydrolytic silyl group-containing vinyl monomers include $CH_2=CHSi(CH_3)(OCH_3)_2$, $CH_2=CHSi(OCH_3)_3$, $CH_2=CHSi(CH_3)Cl_2$, $CH_2=CHSiCl_3$, $CH_2=CHCOO(CH_2)_2Si(CH_3)(OCH_3)_2$, $CH_2=CHCOO(CH_2)_2Si(OCH_3)_3$, $CH_2=CHCOO(CH_2)_3Si(CH_3)(OCH_3)_2$, $CH_2=CHCOO(CH_2)_3Si(OCH_3)_3$, $CH_2=CHCOO(CH_2)_2Si(CH_3)Cl_2$, $CH_2=CHCOO(CH_2)_2SiCl_3$, $CH_2=CHCOO(CH_2)_3Si(CH_3)Cl_2$, $CH_2=CHCOO(CH_2)_3SiCl_3$, $CH_2=C(CH_3)COO(CH_2)_2Si(CH_3)(OCH_3)_2$, $CH_2=C(CH_3)COO(CH_2)_2Si(OCH_3)_3$, $CH_2=C(CH_3)COO(CH_2)_3Si(CH_3)(OCH_3)_2$, $CH_2=C(CH_3)COO(CH_2)_3Si(OCH_3)_3$, $CH_2=C(CH_3)COO(CH_2)_2Si(CH_3)Cl_2$, $CH_2=C(CH_3)COO(CH_2)_2SiCl_3$, $CH_2=C(CH_3)COO(CH_2)_3Si(CH_3)Cl_2$, $CH_2=C(CH_3)COO(CH_2)_3SiCl_3$,

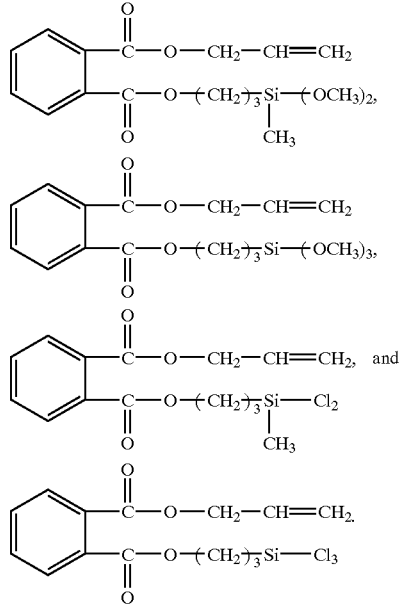

These hydrolytic silyl group-containing vinyl monomers can be used either alone or as a mixture of two or more of them.

As the hydrophilic functional group-containing vinyl monomer used in the method of (ii), for example, one or more monomers similar to the hydrophilic functional group-containing vinyl monomers exemplified for the method of (i) can be used.

Further, in the method of (ii), one or more of the other vinyl monomers exemplified for the method of (i) described above can also be copolymerized.

In the invention, the particularly preferred content of the hydrophilic functional group-containing vinyl monomer in vinyl polymer (b) varies depending on the kind of vinyl monomer as follows:

(a) The total content of the unsaturated carboxylic acid and/or unsaturated carboxylic acid anhydride is particularly preferably from 0.5% to 10% by weight;

(b) The content of the hydroxyl group-containing vinyl monomer is particularly preferably from 5% to 30% by weight; and (c) The total content of the amino group-containing vinyl monomer and/or amineimido group containing-vinyl monomer is particularly preferably from 0.05% to 3% by weight.

In the invention, the content of the hydrophilic functional group-containing vinyl monomer within the above-defined range results in particularly excellent storage stability of the resulting aqueous dispersion.

Further, in the invention, it is preferred that two or more of any of the vinyl monomers shown in the above (a), (b) and (c) are used in combination, and it is particularly preferred that one or more of the respective vinyl monomers shown in the above (a), (b), and (c) are used in combination.

The number average molecular weight converted to polystyrene of vinyl polymer (b) thus prepared is preferably from 2,000 to 100,000, and more preferably from 4,000 to 50,000.

In the invention, vinyl polymers (b) can be used either alone or as a mixture of two or more of them.

The amount of vinyl polymer (b) used in the invention is generally from 2 parts to 900 parts by weight, preferably from 10 parts to 400 parts by weight, and more preferably from 20 parts to 200 parts by weight, based on 100 parts by weight of polyorganosiloxane (a). In this case, when the amount of vinyl polymer (b) used is less than 2 parts by weight, the alkali resistance of a coating film formed from the aqueous dispersion tends to deteriorate. On the other hand, when the amount of vinyl polymer (b) exceeds 900 parts by weight, the weather resistance of a coating film tends to deteriorate.

Synthesis of Aqueous Dispersion

The composition of the invention comprises the aqueous dispersion in which the specific polymer comprising component (a) and component (b) are dispersed in an aqueous medium. In this case, the specific polymer is dispersed, for example, in the particle form or the aqueous sol form. The average particle size of the specific polymer in the particle form is generally from 0.001 μm to 100 μm, and preferably from 0.01 μm to 10 μm. Though the aqueous medium in the aqueous dispersion is substantially composed of water, it may include an organic solvent such as an alcohol in an amount of about 50% by weight or less.

The aqueous dispersion of the invention can be preferably manufactured by (iii) a method of hydrolyzing and/or partially condensing organosilane (a) and vinyl polymer (b) in an organic solvent in the presence of organic metal compound (d) described later and water, dispersing the reaction solution in an aqueous medium, and then removing the organic solvent.

In the method of (iii), the amount of water existing in hydrolysis and/or condensation is generally from 0.5 mol to 3.0 mols, and preferably from 0.7 mol to 2.0 mols, per mol of organosilane (a).

When the reaction product is dispersed in the aqueous medium in the method of (iii), an emulsifying agent and a pH adjusting agent can be used.

As the above emulsifying agents, there can be used any of surfactants such as alkyl sulfates, alkylaryl sulfates, alkyl phosphates and fatty acid salts; cationic surfactants such as alkyl amine salts and alkyl quaternary amines; nonionic surfactants such as polyoxyethylene alkyl ethers, polyoxyethylene alkylaryl ethers and block-type polyethers; amphoteric surfactants such as carboxylic acid type surfactants (for example, amino acid type and betaine type surfactants), and sulphonic acid type surfactants. These emulsifying agents can be used either alone or as a mixture of two or more of them.

As the organic solvents used in the method of (iii), for example, alcohols, aromatic hydrocarbons, ethers, ketones and esters are preferred. These organic solvents may be partially removed before the dispersion of the reaction solutions in the aqueous media.

As to the reaction conditions in the hydrolysis and the condensation in the method of (iii), the temperature is generally from 20° C. to 70° C., and the reaction time is usually from 1 hour to 8 hours.

In the method of (iii), when silyl group-containing vinyl polymer (b) contains an acidic group such as a carboxylic group or a carboxylic acid anhydride group, it is preferred that at least one basic compound is added after the hydrolysis and/or the condensation to dissociate the carboxyl group, thereby being able to improve the emulsion dispersibility of the specific polymer.

The above-mentioned basic compounds include, for example, amines such as ammonia, methylamine, dimethylamine, trimethylamine, ethylamine, diethylamine, triethylamine, ethanolamine, diethanolamine and dimethylaminoethanol; and alkaline metal hydroxides such as potassium hydroxide and sodium hydroxide.

The pH value of the dispersion after dispersing by emulsification is generally from 6 to 10, and preferably from 6.5 to 9.

Oxazoline Derivative (c)

The coating composition of the invention contains an oxazoline derivative having at least one, preferably two or more oxazoline groups (dihydroxazolyl groups) (such a oxazoline derivative is hereinafter referred to as "oxazoline derivative (c)"). The oxazoline derivative has the function that the oxazoline group thereof reacts with the reactive functional group contained in the composition of the invention in the course of drying of the specific polymer to form a network structure, thereby crosslinking a coating film.

The above-mentioned oxazoline derivative (c) may be either a compound having two or more oxazoline groups in one molecule thereof, or a copolymer having repeating units derived from a monomer having one or more oxazoline groups in one molecule thereof. Oxazoline derivative (c), which is the copolymer, is generally synthesized by emulsion polymerization or suspension polymerization of a copolymerizable oxazoline compound such as 2-isopropenyl-2-oxazoline with another copolymerizable vinyl resin.

Oxazoline derivative (c) may be used either in a state where it is dissolved in water and/or an organic solvent, or in a state where it is dispersed in the particle form or the aqueous sol form. The average particle size thereof in the particle form is generally from about 0.01 μm to about 0.5 μm.

Commercially available products of oxazoline derivative (c) used in the invention include EPOCROSS K-1000, K-1020E, K-1030E, K-2010E, K-2020E, K-2030E and WS-500 manufactured by Nippon Shokubai Co., Ltd.

In the invention, the amount of oxazoline derivative (c) used is generally from 0.1 part to 30 parts by weight, and preferably 0.5 part to 20 parts by weight, based on 100 parts by weigh of specific polymer composed of component (a) and component (b). Less than 0.1 part results in the tendency of adhesion to deteriorate, whereas exceeding 30 parts results in the tendency of water resistance to deteriorate.

Oxazoline derivative (c) can be mixed in any step for preparing the coating composition of the invention, either before or after synthesis of the specific polymer composed of component (a) and component (b). It is preferably added after the synthesis.

The coating composition of the invention may contain the following optional components (d) to (h).

Organic Metal Compound (d)

In the coating composition of the invention, it is preferred that a chelate compound of a metal selected from the group consisting of zirconium, titanium and aluminum (such a compound is hereinafter also referred to as "organic metal compound (d)") is mixed.

It is considered that organic metal compound (d) has a function of promoting the hydrolysis and/or condensation of the above-mentioned polyorganosiloxane (a) and vinyl polymer (b) to accelerate the formation of a co-condensation product of both components.

Examples of such organic metal compounds (d) include compounds represented by the formulae: $Zr(OR^5)_p (R^6COCHCOR^7)_{4-p}$, $Ti(OR^5)_q(R^6COCHCOR^7)_{4-q}$ and $Al(OR^5)_r(R^6COCHCOR^7)_{3-r}$, and partial hydrolyzates of these compounds.

In organic metal compound (d), $R^5$ and $R^6$ each independently represent monovalent hydrocarbon groups each having from 1 to 6 carbon atoms, specifically, ethyl, n-propyl, i-propyl, n-butyl, sec-butyl, t-butyl, n-pentyl, n-hexyl, cyclohexyl or phenyl; and $R^7$ represents an alkoxy group having from 1 to 16 carbon atoms, specifically, methoxy, ethoxy, n-propoxy, i-propoxy, n-butoxy, sec-butoxy, t-butoxy, lauryloxy or stearyloxy, as well as a monovalent hydrocarbon group having from 1 to 6 carbon atoms similar to that of $R^5$ or $R^6$.

Further, p and q are each integers of from 0 to 4; and r is an integer from 0 to 3.

Specific examples of such organic metal compounds (d) include zirconium compounds such as tri-n-buthoxy.ethylacetoacetate zirconium, di-n-butoxy-bis (ethylacetoacetate) zirconium, n-butoxy tris (ethylacetoacetate) zirconium, tetrakis(n-propylacetoacetate) zirconium, tetrakis(acetylacetoacetate) zirconium, tetrakis(ethylacetoacetate) zirconium and tetrabutoxyzirconium; titanium compounds such as di-i-propoxy.bis(ethylacetoacetate) titanium, di-i-propoxy-.bis (acetylacetate) titanium, di-isopropoxy.bis(acetyl-acetone) titanium, tetraisopropyl titanate, tetra-n-butyl titanate and tetrastyryl titanate; and aluminum compounds such as di-i-propoxy.ethylacetoacetate aluminum, di-i-propoxy.-acetylacetonato aluminum, i-propoxy.bis(ethylacetoacetate) aluminum, i-propoxy.bis(acetylacetonato) aluminum, tris-(ethylacetoacetate) aluminum, tris(acetylacetonato) aluminum, monoacetylacetonato bis(ethylacetoacetate) aluminum, aluminum i-propionate, mono-sec-butoxyaluminum diisopropylate, aluminum sec-butyrate and aluminum ethylate.

Of these compounds, tri-n-butoxy.ethylacetoacetate zirconium, di-i-propoxy.bis(acetylacetonato) titanium, di-i-propoxy.ethylacetoacetate aluminum and tris (ethylacetoacetate) aluminum are preferred. These organic metal compounds (d) can be used either alone or as a mixture of two or more of them.

Organic metal compound (d) is preferably used as a solution thereof in an organic solvent. Preferred examples of the organic solvents in this case include alcohols, aromatic hydrocarbons, ethers, ketones and esters.

In the invention, the amount of organic metal compound (d) used is preferably from 0.01 part to 50 parts by weight, and more preferably from 0.1 part to 50 parts by weight, based on 100 parts by weight of polyorganosiloxane (a). In this case, when the amount of organic metal compound (d) exceeds 50 parts by weight, the storage stability of the aqueous dispersion tends to deteriorate, or cracks are liable to develop in the coating film in some cases.

βKeto Compound (e)

For further improving the storage stability, the coating composition of the invention may contain at least one of β-diketones represented by the following general formula and/or β-ketoesters (these compounds are hereinafter collectively referred to as "β-keto compound (e)"):

wherein $R^6$ and $R^7$ have the same meanings as defined for $R^6$ and $R^7$ in the above-mentioned general formula representing the organic metal compound (d).

When the coating composition of the invention contains the above-mentioned organic metal compound (d), it is preferred that β-keto compound (e) is further added.

Specific examples of such β-keto compounds (e) include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione and 5-methyl-2,4-hexanedione. Of these, ethyl acetoacetate and acetylacetone are preferred, and acetylacetone is particularly preferred.

The amount of β-keto compound (e) used in the invention is generally 2 mols or more, and preferably from 3 mols to 20 mols, based on mol of organic metal compound (d). In this case, when the amount of β-keto compound (e) used is less than 2 mols, the effect on improving the storage stability of the resulting aqueous dispersion tends to decrease.

Filler (f)

For developing various characteristics of the resulting hardened films such as coloration, thickening, prevention of UV light transmission to base materials, corrosion resistance and heat resistance, the following fillers can also be added to and dispersed in the coating compositions of the invention.

The fillers added for heightening the hardness of the hardened films (such fillers are hereinafter also referred to as "filler (E1)") include particles and/or sols, or colloids of the following inorganic compounds.

Specific examples of the above-mentioned inorganic compounds include $SiO_2$, $TiO_2$, $TiO_3$, $SrTiO_2$, $FeTiO_3$, $WO_3$, $SnO_2$, $Bi_2O_3$, $In_2O_3$, $ZnO$, $RuO_2$, $CdO$, $CdS$, $CdSe$, $GaP$, $GaAs$, $CdFeO_3$, $Al_2O_3$, $Al(OH)_3$, $Sb_2O_5$, $Si_3N_4$ $Sn$—$In_2O_3$, $Sb$—$In_2O_3$, $MgF$, $CeF_3$, $CeO_2$, $3Al_2O_3.2SiO_2$, $BeO$, $SiC$, $AlN$, $Fe$, $Fe_2O_3$, $CO$, $Co$—$FeO_x$, $CrO_2$, $Fe_4N$, $Ba$ ferrite, $SmCO_5$, $YCO_5$, $CeCO_5$, $PrCO_5$, $Sm_2CO_{17}$, $ZrO_2$, $Nd_2Fe_{14}B$ and $Al_4O_3$.

These inorganic compounds can be used either alone or as a mixture of two or more of them.

The existing forms of filler (f) before it is formulated into the coating composition may be a granular powder, an aqueous sol or colloid in which fine particles are dispersed in water, a solvent sol or colloid in which fine particles are dispersed in a polar solvent such as isopropyl alcohol or in a non-polar solvent such as toluene. In the case of the solvent sol or colloid, it may be used by further diluting it with water or a solvent, depending on the dispersibility of the fine semiconductor particles.

When filler (f) is the aqueous sol or colloid, or the solvent sol or colloid, the solid concentration thereof is preferably 40% by weight or less.

Of fillers (f), colloidal silica is commercially available under trade names such as Snowtex, Methanol Silica Sol and Isopropanol Silica Sol (manufactured by Nissan Chemical Industries Ltd.); Cataloid SN and Oscal (manufactured by Catalyst & Chemicals Industries Co., Ltd.); Ludex (manufactured by E. I. du Pont de Nemours and Company, USA); Syton (manufactured by Monsanto Company, USA); and Nalcoag (manufactured by Nalco Chemical Company, USA). Colloidal alumina described above is also commercially available under trade names such as Alumina Sol-100, Alumina Sol-200 and Alumina Sol-520 (manufactured by Nissan Chemical Industries Ltd.); and Alumina Clear Sol, Alumina Sol 10 and Alumina Sol 132 (manufactured by Kawaken Fine Chemicals Co., Ltd.).

Filler (f) may be added to the coating composition either after preparation of the composition, or in preparing the composition, followed by hydrolysis or condensation of organosilane (a) and vinyl polymer (b).

The amount of filler (f) used in the invention is generally from 0 part to 500 parts by weight, and preferably from 0.1 part to 400 parts by weight, as solid content, based on 100 parts by weight of polyorganosiloxane (a).

Examples of fillers for developing coloration, designing and thickening of the coating films, and promoting the corrosion resistance and the weather resistance (such fillers are hereinafter also referred to as "filler (E2)") include metals and alloys; compounds such as metal oxides, hydroxides, carbides, nitrides and sulfates; and water-insoluble pigments such as organic pigments and inorganic pigments. These components are used in the particle, filament, whisker or scale form.

Specifc examples of fillers (E2) include iron, nickel, aluminum, zinc, copper, silver, carbon black, graphite, stainless steel, ferricoxide, ferrite, cobalt oxide, manganese oxide, chromium oxide, pigment zirconium oxide, pigment titanium oxide (rutile type), zirconium oxide, silicon dioxide, lead suboxide, aluminum oxide, zinc oxide, copper suboxide, iron dihydroxide, aluminum hydroxide, calcium hydroxide, barium carbonate, calcium carbonate, magnesium carbonate, lead sulfate, basic lead sulfate, barium sulfate, gypsum, molybdenum disulfide, lead sulfide, copper sulfide, lead silicate, calcium plumbate, copper borate, potassium titanate, silicon carbide, silicon nitride, boron nitride, lead phthalate, synthetic mullite, clay, diatomaceous earth, talc, bentonite, mica, green earth, cobalt green, manganese green, viridian, Guignet's green, cobalt-chromium green, Schulek green, chromium green, zinc green, pigment green, ultramarine blue, rock ultramarine blue, iron blue, cobalt blue, selrian blue, molybdenum blue, cobalt violet, mars violet, manganese violet, pigment violet, zinc yellow, chromium yellow, cadmium yellow, strontium yellow, titanium yellow, litharge, pigment yellow, loess, cadmium red, selenium red, chromium vermilion, red iron oxide, lead zinc flower, bunchison white, manganese white, bone black, diamond black, thermatomic black and plant black.

These fillers (E2) can be used either alone or as a mixture of two or more of them.

The amount of filler (E2) used in the invention is generally 300 parts by weight or less, based on 100 parts by weight of the total solid matter of the aqueous dispersion used in the invention. When the amount of filler (E2) exceeds 300 parts by weight, the adhesion of the coating film decreases in some cases.

Hardening Accelerator (g)

For accelerating the hardening rate of the coating composition of the invention, a hardening accelerator other than the above-described organic metal compound (d) (such a hardening accelerator is hereinafter also referred to as "hardening accelerator (g)") can also be used in the coating composition, depending on the hardening conditions. This hardening accelerator is particularly effective when hardening treatment is performed at relatively low temperatures.

Examples of hardening accelerators (g) include alkali metal salts of acids such as naphthenic acid, octylic acid, nitrous acid, sulfurous acid, aluminic acid and carbonic acid; amine compounds such as ethylenediamine, hexanediamine, diethylenetriamine, triethylenetetramine, tetraethylenepentamine, piperidine, piperazine, methaphenylenediamine, ethanolamine, triethylamine, aminopropyltrimethoxysilane, aminopropyltriethoxysilane, aminopropylmethyldimethoxysilane, aminopropylmethyldiethoxysilane, N-phenyl-γ-aminopropyltrimethoxysilane, N-butyl-γ-aminopropyltrimethoxysilane, N-β-(aminoethyl)-γ-aminopropyltrimethoxysilane, N-β-(aminoethyl)-γ-aminopropylmethyldimethoxysilane, N-i-(aminoethyl)-γ-aminopropyltriethoxysilane, N-(6-aminohexyl)-γ-aminopropyltrimethoxysilane, N-(6-aminohexyl)-γ-aminopropylmethyldimethoxysilane, N-(6-aminohexyl)-γ-aminopropyltriethoxysilane, N-[styryl (aminomethyl)]-γ-aminopropyltrimethoxysilane, N-[styryl (aminomethyl)]-γ-aminopropylmethyldimethoxysilane, N-[styryl(aminomethyl)]-γ-aminopropyltriethoxysilane, N-[N-β-(aminoethyl)amino-ethyl]-γ-aminopropyl-trimethoxysilane, N-[N-β-(amino-ethyl)aminoethyl]-γ-aminopropylmethyldimethoxysilane, N-[N-β-(aminoethyl) aminoethyl]-γ-aminopropyltriethoxysilane, N-[N-(benzylmethyl)aminoethyl]-γ-aminopropyltrimethoxysilane, N-[N-(benzylmethyl)aminoethyl]-γ-aminopropylmethyldimethoxysilane, N-[N-(benzylmethyl) aminoethyl]-γ-aminopropyltriethoxysilane, N-[N-(benzyl) aminoethyl]-γ-aminopropyltrimethoxysilane, N-[N-(benzyl) aminoethyl]-γ-aminopropylmethyldimethoxysilane, N-[N-(benzyl)aminoethyl]-γ-aminopropyltriethoxysilane, N-phenylaminopropyltrimethoxysilane, N-phenyl-aminopropylmethyldimethoxysilane, N-phenyl-aminopropyltriethoxysilane, N-phenylaminomethyl-trimethoxysilane, N-phenylaminomethyldimethoxysilane, N-phenylaminomethyltriethoxysilane, bis (trimethoxysilylpropyl)amine, P-[N-(2-aminoethyl) aminomethyl]phenethyltrimethoxysilane, N-[(3-trimethoxysilyl)propyl]diethylenetriamine, N-[(3-trimethoxysilyl)propyl]triethylenetetramine, N-3-trimethoxysilylpropyl-m-phenylenediamine and various modified amines used as hardening agents for epoxy resins; carboxylic acid type organic tin compounds such as $(C_4H_9)_2$ $Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn$ $(OCOCH_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn$ $(OCOCH=CHCOOC_8H_{17})_2$ and $Sn(OCCC_8H_{17})_2$; mercaptide type organic tin compounds such as $(C_4H_9)_2Sn$ $(SCH_2COOC_8H_{17})_2$, $(C_4H_9)_2Sn(SCH_2CH_2COOC_8H_{17})_2$, $(C_8H_{17})_2Sn(SCH_2COOC_8H_{17})_2$, $(C_8H_{17})_2Sn$ $(SCH_2CH_2COOC_8H_{17})_2$, $(C_8H_{17})_2Sn(SCH_2COOC_8H_{25})_2$ and $(C_8H_{17})_2Sn(SCH_2CH_2COOC_{12}H_{25})_2$; sulfide type organic tin compounds such as $(C_4H_9)_2Sn=S$ and $(C_8H_{17})_2$ $Sn=S$; organic tin oxides such as $(C_4H_9)_2SnO$ and $(C_8H_{17})_2$ $SnO$; and reaction products of these organic tin oxides with ester compounds such as ethyl silicate, dimethyl maleate, diethyl maleate and dioctyl phthalate.

These hardening accelerators (g) can be used either alone or as a mixture of two or more of them.

Methods for adding hardening accelerator (g) to the aqueous dispersion include a method of adding hardening accelerator (g) as it is, a method of adding hardening accelerator (g) previously diluted with an alcoholic solvent, and a method of adding an emulsifier to hardening accelerator (g), followed by emulsified dispersion thereof in water.

The amount of hardening accelerator (g) used in the invention is generally from 0 part to 100 parts by weight, preferably from 0.1 part to 80 parts by weight, and still more preferably from 0.5 part to 50 parts by weight, based on 100 parts by weight of polyorganosiloxane (a).

Multifunctional Hydrazine Derivative (h)

The coating composition of the invention may further contain a multifunctional hydrazine derivative having two or more hydrazino groups in a molecule (such a multifunctional hydrazine derivative is hereinafter also referred to as "multifunctional hydrazine derivative (h)"). Multifunctional hydrazine derivative (h) is preferably added in the case where vinyl polymer (b) constituting the composition of the invention contains a carbonyl group. The multifunctional hydrazine derivative has the function that the hydrazino group reacts with the carbonyl group contained in the composition in the course of drying of the coating composition after application thereof to form a network structure, thereby crosslinking the coating film.

As multifunctional hydrazine derivative (h) described above, for example, a water-soluble hydrazine is preferred. Such water-soluble hydrazines include a dicarboxylic acid dihydrazide having from 2 to 10 carbon atoms in total, preferably from 4 to 6 carbon atoms in total, such as oxalic acid dihydrazide, malonic acid dihydrazide, succinic acid dihydrazide, glutaric acid dihydrazide, adipic acid dihydrazide, sebacic acid dihydrazide, phthalic acid dihydrazide, isophthalic acid dihydrazide, terephthalic acid dihydrazide, maleic acid dihydrazide, fumaric acid dihydrazide or itaconic acid dihydrazide; a hydrazide having three or more functional groups, such as citric acid trihydrazide, nitriloacetic acid trihydrazide, cyclohexanetricarboxylic acid trihydrazide or ethylenediaminetetraacetic acid tetrahydrazide; and an aliphatic dihydrazine having from 2 to 4 carbon atoms in total, such as ethylene-1,2-dihydrazine, propylene-1,2-dihydrazine, propylene-1,3-dihydrazine, butylene-1,2-dihydrazine, butylene-1,3-dihydrazine, butylene-1,4-dihydrazine or butylene-2,3-dihydrazine.

Further, compounds can also be used in which at least part of hydrazino groups contained in the water-soluble dihydrazines are blocked by reacting them with carbonyl compounds such as acetaldehyde, propionaldehyde, butylaldehyde, acetone, methyl ethyl ketone, diethyl ketone, methyl propyl ketone, methyl butyl ketone and diacetone alcohol (such blocked compounds are hereinafter referred to as "blocked multifunctional hydrazine derivatives). Examples thereof include dihydrazidomonoacetonehydrazone adipate and dihydrazidediacetonehydrazone adipate. The use of such blocked multifunctional hydrazine derivatives makes it possible to appropriately control the crosslinking reaction of the aqueous dispersions, so that the re-dispersibility thereof can be further improved, which is particularly important as printing ink.

Of these multifunctional hydrazine derivatives, adipic acid dihydrazide, sebacic acid dihydrazide, isophthalic acid dihydrazide and dihydrazidediacetonehydrazone adipate are preferred.

The above-mentioned multifunctional hydrazine derivatives can be used either alone or as a mixture of two or more of them.

The amount of multifunctional hydrazine derivative (h) used in the invention is such an amount that the equivalent ratio of the carbonyl group in the specific polymer to the hydrazino group is generally in a range of from 1:0.1 to 1:5, preferably from 1:0.5 to 1:1.5, and more preferably from 1:0.7 to 1:1.2. In this case, when the equivalent ratio of the hydrazino group to the carbonyl group is less than 0.1, the solvent resistance and damage resistance of the coating film tend to decrease. On the other hand, when the equivalent ratio exceeds 5, the water resistance and transparency of the coating film tend to deteriorate. When the blocked multifunctional hydrazine derivative is used as the multifunctional hydrazine derivative, the equivalent ratio of the carbonyl group to the hydrazino group contained in the multifunctional hydrazine derivative before it is blocked is used as the above-mentioned equivalent ratio.

Although the multifunctional hydrazine derivative (h) can be added in any of the steps of preparing the composition used in the invention, it is desirable that multifunctional hydrazine derivative (h) is added after polymerization of the composition comprising component (a) and component (b).

Other Additives

The composition of the invention may contain resinous additives.

Examples of the resinous additives include water-soluble polyester resins usually used for aqueous paint, water-soluble or water-dispersible epoxy resins, water-soluble or water-dispersible acrylic resins, carboxyl group-containing aromatic vinyl resins such as styrene-maleic acid copolymers and urethane resins.

These resinous additives may be used either alone or as a mixture of two or more of them.

The amount of the resinous additive used in the invention is generally 50 parts by weight or less, and preferably 30 parts by weight or less, based on 100 parts by weight of the total solid matter of the aqueous dispersion.

In addition, the coating composition of the invention may contain an organic solvent for improving the film forming characteristics and the wettability.

Examples of the above-mentioned organic solvents include alcohols such as methyl alcohol, ethyl alcohol, n-propyl alcohol, i-propyl alcohol, n-butyl alcohol, i-butyl alcohol, n-amyl alcohol and n-hexyl alcohol, ethylene glycol menomethyl ether, ethylene glycol monoethyl ether, ethylene glycol mono-n-propyl ether, ethylene glycol mono-i-propyl ether, ethylene glycol mono-n-butyl ether, ethylene glycol mono-n-hexyl ether, diethylene glycol monomethyl ether, diethylene glycol monoethyl ether, diethylene glycol mono-i-propyl ether, ethylene glycol monomethyl ether acetate, ethylene glycol monoethyl ether acetate and tributoxymethyl phosphate.

These organic solvents can be used either alone or as a mixture of two or more of them.

The amount of the organic solvent used in the invention is generally 50% by weight or less, and preferably 20% by weight or less, based on the total amount of the aqueous dispersion.

The aqueous dispersions used in the invention may also contain other additives such as a pigment, a thickener, a dispersing agent, a silane coupling agent, a titanium coupling agent, a leveling agent, a dye, a fungicide, a preservative, an age resistor, an antioxidant, an adhesive, a cloud resistive agent and a flame retardant, as required.

The total solid content of the coating composition of the invention is usually 50% by weight or less, and preferably from 20% to 40% by weight. It is appropriately controlled according to the object of use, the kind of substrate, the coating method and the thickness of the coating film. For example, when the coating composition is used for impregnating a thin film substrate with it, the total solid content thereof is usually from 5% to 30% by weight. When the coating composition is used for forming a thick film, the total solid content thereof is usually from 20% to 50% by weight, and preferably from 30% to 45% by weight. When the total solid content of the coating composition of the invention exceeds 50% by weight, the storage stability thereof deteriorates in some cases.

Hardened Film

The hardened film of the invention has a constitution of substrate/composition of the invention or substrate/undercoating composition/composition of the invention.

When the compositions of the invention are applied onto substrates, all the compositions are applied by use of a brush, a roll coater, a flow coater, a centrifugal coater or an ultrasonic coater, or by dip coating, flow coating, spray coating, a screen process, electrodeposition or vapor deposition.

When the coating film of the coating composition of the invention is formed on the substrate, the coating film having a thickness of about 0.05 μm to about 20 μm in one application or about 0.1 μm to 40 μm in two applications, as the dry coating film, can be formed. Then, the composition applied onto the substrate is dried at room temperature, or heated at a temperature of about 30° C. to about 200° C., usually for 1 minute to 60 minutes to dry it, thereby forming the coating film on the substrate.

Substrate

Examples of materials for the substrates used in the hardened films of the invention include metals such as iron aluminum and stainless steel; inorganic ceramic materials such as cement, concrete, ALC, flexible boards, mortar, slate, gypsum, ceramics and brick; shaped articles of plastics such as phenol resins, epoxy resins, polyesters, polycarbonates, polyethylene, polypropylene and ABS resins (acrylonitrile-butadiene-styrene resins); films of plastics such as polyethylene, polypropylene, polyvinyl alcohol, polycarbonates, polyethylene terephthalate, polyurethanes and polyimides; wood, paper and glass. The compositions of the invention are also useful for repainting of deteriorated coating films.

The substrates can also be preliminarily surface treated for base preparation, improvement in adhesion, sealing of porous substrates, smoothing and patterning.

The surface treatments to the metallic substrates include, for example, polishing, degreasing, plating treatment, chromate treatment, flame treatment and coupling treatment, and the surface treatments to the plastic substrates include, for example, blast treatment, treatment with chemicals, degreasing, flame treatment, oxidation treatment, vapor treatment, corona discharge treatment, ultraviolet irradiation treatment, plasma treatment and ion treatment. The surface treatments to the inorganic ceramic substrates include, for example, polishing, sealing and patterning, and the surface treatments to the wood substrates include, for example, polishing, sealing and insect proofing treatment. The surface treatments to the paper substrates include, for example, sealing and insect proofing treatment, and the surface treatments to the deteriorated coating films include, for example, Polishing.

The coating operation in the invention varies depending on the kind and state of substrate and the coating method. For example, in the case of the metallic substrates, undercoating compositions maybe used in addition to the coating compositions of the invention, if rust prevention is required. In the case of the inorganic ceramic substrates, the covering properties of the coating films become necessary depending on the characteristics (surface roughness, impregnation properties and alkalinity and so forth) of the substrates, so that the undercoating compositions such as enamel are used in some cases.

Further, when the metal, wood, glass, plastic and paper substrates are coated, or when the deterioration of the old coating films are significant in repainting the deteriorated coating films, the undercoating compositions may be used depending on their application.

There is no particular limitation on the kind of undercoating composition, as long as it has the function of enhancing the adhesion between the substrate and the composition, and it is selected depending on the kind and purpose of application of substrate. The undercoating compositions can be used either alone or as a mixture of two or more of them. They may be either enamel containing coloring components, or clear, containing no coloring components.

As the undercoating compositions, there can be used, for example, resins used as solutions in solvents, such as alkyd resins, aminoalkyd resins, epoxy resins, polyesters, acrylic resins, urethane resins, fluorine resins and acrylic silicone resins. Particularly preferred examples thereof include aqueous emulsions such as acrylic resin emulsions, epoxy resin emulsions, polyurethane emulsions and polyester emulsions. When the adhesion is required between the substrate and the coating film under severe conditions, various functional groups can be imparted to these undercoating compositions. Such functional groups include, for example, a hydroxyl group, a carboxyl group, a carbonyl group, an amido group, an amine group, a glycidyl group, an alkoxysilyl group, an ether bond and an ester bond. Further, hardening accelerators may be added to the resins used as undercoat layers. The hardening accelerators include the above-mentioned oxazoline derivative (c), hardening accelerators (g), multifunctional hydrazine derivatives (h), imidazole derivatives, acid anhydrides and polyamide resins.

The invention can provide the coating compositions and the hardened films, in which the hardening reaction of the coating films is completed at low temperature for a short period of time by use of the specific crosslinking agents, thereby giving high hardness immediately after hardening, and providing water resistance, weather resistance, organic chemical resistance, acid resistance, alkali resistance, wear resistance and durable adhesion.

The invention will be illustrated with reference to examples in more detail below, but the following examples are not intended to limit the scope of the invention.

Parts and percentages in the examples and comparative examples are on a weight basis, unless otherwise specified.

Measurements and evaluations in the examples and comparative examples were made as follows:

The Mw was measured by gel permeation chromatography (GPC) according to the following conditions:

A sample was prepared by dissolving 1 g of a specific polymer in 100 cc of tetrahydrofuran. Standard polystyrene manufactured by Pressure Chemical Co., Ltd., USA was used as standard polystyrene.

Apparatus: High temperature and high speed gel permeation chromatogram (model 150-C ALC/GPC, manufactured by Waters Co., Ltd., USA);

Column: SHODEX A-8M (50 cm in length) manufactured by Showa Denko K.K.;

Measuring temperature: 40° C.;

Flow rate: 1 cc/minute.

Initial Adhesion

A peeling test using a tape was conducted, and the initial adhesion was evaluated as follows:

◯: The tape did not peel at all.

Δ: The tape partially peeled.

×: The tape entirely peeled.

Initial Hardness

The hardness was based on the pencil hardness according to JIS K5400.

Initial Water Resistance

A test piece was immersed in pure water at normal temperature for 5 minutes, and then, using the pencil hardness according to JIS K5400, a load at which no scratch was developed was confirmed by changing the load of a pencil having a hardness of H.

◯: The load was 500 g or more.

Δ: The load was from 200 g to less than 500 g.

×: The load was less than 200 g.

Chemical Resistance

Onto a coating film, 2 cc of isopropyl alcohol was added dropwise, and wiped with cloth after 5 minutes, followed by visual observation of the state of the coating film.

◯: No change was observed.

Δ: Although a mark of dropping remained, there was no change in luster and adhesion.

×: The luster decreased, or the film was dissolved.

Weather Resistance

A 3,000-hour irradiation test was conducted using a sunshine weatherometer according to JIS K5400, followed by visual observation of appearance (cracks and peelings).

⊚: The luster retention was 90% or more.

○: The luster retention was from 80% to less than 90%.

Δ: The luster retention was from 50% to less than 80%.

×: The luster retention was less than 50%.

Hot Water Resistance

A test piece was immersed in hot water at 60° C. for 14 days, followed by visual observation of the state of a coating film.

○: No crack was observed.

Δ: One or more cracks were observed under a microscope.

×: One or more cracks were visually observed.

Reference Example 1

Synthesis of Silyl Group-Containing Vinyl Polymer (b)

In a reaction vessel equipped with a stirrer and a reflux condenser, 40 parts of methyl methacrylate, 18 parts of 2-ethylhexyl acrylate, 5 parts of acrylic acid, 13 parts of 2-hydroxyethyl methacrylate, 15 parts of γ-methacryloxypropyltrimethoxysilane, 5 parts of 4-(meth)acryloyloxy-2,2,6,6-tetramethylpiperidine, 6 parts of diacetoneacrylamide, 1 parts of 1,1,1-trimethylamine methacrylimide and 135 parts of i-propyl alcohol were placed, and mixed. Then, the mixture was heated to 80° C. with stirring, and a solution in which 4 parts of azobisisovaleronitrile was dissolved in 15 parts of methyl ethyl ketone was added dropwise to the mixture for 30 minutes, followed by reaction at 80° C. for 5 hours to obtain a silyl group-containing vinyl polymer (hereinafter referred to as "(b-1)") with a solid concentration of 40%.

Reference Examples 2 and 3

Synthesis of Silyl Group-Containing Vinyl Polymers (b)

Silyl group-containing vinyl polymers (b-2) and (b-3) were obtained in the same manner as with Reference Example 1 except that monomer compositions shown in Table 1 were used.

TABLE 1

| Reference Example | 1 | 2 | 3 |
|---|---|---|---|
| Name of Composition | b-1 | b-2 | b-3 |
| Monomer Composition (parts) | | | |
| Methyl methacrylate | 40 | 38 | 43 |
| 2-Ethylhexyl acrylate | 18 | 9 | 23 |
| Acrylic acid | 5 | 5 | 5 |
| 2-Hydroxyethyl methacrylate | 10 | 10 | 10 |
| γ-Methacryloxypropyltrimethoxysilane | 15 | 30 | 10 |
| Diacetoneacrylamide | 6 | 6 | 6 |
| 1,1,1-Trimethylamine methacrylimide | 1 | 1 | 1 |
| 4-(Meth)acryloyloxy-1,2,2,6,6-pentamethyl-piperidine | 5 | 1 | 1 |
| 4-(Meth)acryloyloxy-2,2,6,6-tetramethyl-piperidine | | | 1 |
| i-Propyl alcohol | 135 | 135 | 135 |
| Methyl ethyl ketone | 15 | 15 | 15 |
| Solid concentration (%) | 40 | 40 | 40 |

Reference Examples 4 to 10

Preparation of Undercoating Compositions

Respective components shown in Table 2 were mixed by stirring to obtain undercoating compositions (I) to (VII).

TABLE 2

| Reference Example | 4 | 5 | 6 | 7 | 8 | 9 | 10 |
|---|---|---|---|---|---|---|---|
| Name of Undercoating Composition | I | II | III | IV | V | VI | VII |
| Composition (parts) | | | | | | | |
| Acrylic silicone emulsion AQ8181*[1] | 77 | 77 | | | | 77 | 77 |
| Acrylic emulsion AE378*[2] | | | 77 | 77 | | | |
| Epoxy emulsion EPI-REZ 3520WY55*[3] | | | | | 77 | | |
| Ion-exchanged water | 3 | 3 | 3 | 3 | 3 | 3 | 3 |
| Pigment | 20 | 20 | 20 | 20 | 20 | 20 | |
| Pigment dispersing agent | 0.1 | 0.1 | 0.1 | 0.1 | 0.1 | 0.1 | |
| Oxazoline derivative k-2020E*[4] | 5 | 5 | 5 | 5 | | | 5 |
| N-β(Aminoethyl)γ-amino-propylmethyl-dimethoxysilane | | 1 | | 1 | 5 | | |

*[1]Manufactured by JSR Corporation, solid concentration: 32%
*[2]Manufactured by JSR Corporation, solid concentration: 32%
*[3]Manufactured by Yuka Shell Epoxy Co., solid concentration: 32%
*[4]Oxazoline derivative (oxazoline group-containing polystyrene polymer) manufactured by Nippon Shokubai Co., Ltd., solid concentration: 40%

EXAMPLE 1

In a reaction vessel equipped with a stirrer and a reflux condenser, 65 parts of methyltrimethoxysilane and 35 parts of dimethyldimethoxysilane as organosilane (1), 50 parts of vinyl polymer (b-1) obtained in Reference Example 1 as vinyl polymer (b), 5 parts of tris(ethylacetoacetate) aluminum as organic metal compound (d), and 15 parts of ion-exchanged water were placed, and reacted at 60° C. for 5.5 hours. Then, the reaction product was cooled to room temperature to obtain a specific polymer having a solid concentration of 40%. The Mw of this specific polymer measured was 20,000.

To 100 parts of this specific polymer solution, 1.5 parts of alkyl sulfate as an emulsifying agent and 3 parts of 10% aqueous ammonia were added at a temperature of 30° C. or less, followed by dilution with 50 parts of i-propyl alcohol. The resulting solution was gradually added to 200 parts of ion-exchanged water for 2 hours to form an emulsion.

Then, i-propyl alcohol and water were removed from the emulsion at a temperature of 50° C. or less under reduced pressure to adjust the total solid concentration to 35%. The pH value at this time was 7.5. To this composition, 7.5 parts of oxazoline derivative (oxazoline group-containing polystyrene polymer) k-1020E (manufactured by Nippon Shokubai Co., Ltd., solid concentration: 40%) was added as an after-addition component to obtain a coating composition of the invention (hereinafter referred to as "composition (a)").

EXAMPLES 2 TO 17

Comparative Example 1

Coating compositions (b) to (q) of the invention and coating composition (r) for comparison were obtained in the same manner as with Example 1 with the exception that components shown in Tables 3 to 5 were used, and 5 parts of an aqueous dispersion of dibutyltin dilaurate (($C_4H_9)_2Sn(OOCC_{11}H_{23})_2$) (trade name: SCAT-1W, manufactured by Sankyo Organic Chemicals Co., Ltd., concentration: 15%) was added as an organic tin hardening agent together with an oxazoline derivative as an after-addition component.

In the tables, *5) to *7) are as follows:

*5) Trifunctional methylsilicone oligomer (a condensation product of methyltrimethoxysilane), Mw=1,000 (approximately decamer)

*6) Trifunctional methylsilicone oligomer (a condensation product of methyltrimethoxysilane), Mw=5,000 (approximately pentacontamer)

*7) Three kinds of derivatives are all manufactured by Nippon Shokubai Co., Ltd., solid concentration: 40%)

TABLE 3

| Example | 1 | 2 | 3 | 4 | 5 | 6 |
|---|---|---|---|---|---|---|
| Name of Composition Component (a) | a | b | c | d | e | f |
| Methyltrimethoxysilane | 65 | 65 | 65 | 65 | 65 | 65 |
| Dimethyldimethoxysilane | 35 | 35 | 35 | 35 | 35 | 35 |
| Component (b) | | | | | | |
| Silyl group-containing vinyl resin (b1) | 50 | 50 | 50 | 50 | 50 | 50 |
| (d)Tris(ethylacetoacetate)-aluminum | 5 | 5 | 5 | 5 | 5 | 5 |
| Ion-exchanged water | 15 | 15 | 15 | 15 | 15 | 15 |
| Isopropyl alcohol | 40 | 40 | 40 | 40 | 40 | 40 |
| After-addition component | | | | | | |
| Oxazoline derivative*7) | | | | | | |
| k-2020E | 7.5 | | | 15 | 7.5 | 7.5 |
| k-1020E | | 7.5 | | | | |
| WS-500 | | | 7.5 | | | |
| Adipic acid hydrazide (10% solution) | | | | | 6 | |
| N-β(Aminoethyl)γ-aminopropyldimethyldimethoxysilane | | | | | | 1 |
| Dibutyltin dilaurate aqueous dispersion | | 5 | 5 | 5 | 5 | 5 |
| Mw of specific polymer (×10⁴) | 2.0 | 2.0 | 2.0 | 2.0 | 2.0 | 2.0 |

TABLE 4

| Example | 7 | 8 | 9 | 10 | 11 | 12 |
|---|---|---|---|---|---|---|
| Name of Composition Component (a) | g | h | i | j | k | l |
| Methyltrimethoxysilane | 40 | 40 | 40 | 65 | 65 | 65 |
| Methylsilicone oligomers (1)*5) | 20 | | | | | |
| Methylsilicone oligomers (2)*6) | | 20 | | | | |
| Tetraethoxysilane | | | 20 | | | |
| Dimethyldimethoxysilane | 40 | 40 | 35 | 35 | 35 | 35 |
| Component (b) | | | | | | |
| Silyl group-containing vinyl resin | | | | | | |
| (b1) | 55 | 55 | 50 | | | 50 |
| (b2) | | | | 50 | | |
| (b3) | | | | | 50 | |
| (d)Tris(ethylacetoacetate)-aluminum | 3 | 3 | 5 | 5 | 5 | |
| Dibutoxydi(ethylacetoacetate)titanium | | | | | | 5 |
| Ion-exchanged water | 13 | 13 | 15 | 15 | 15 | 15 |
| Isopropyl alcohol | 45 | 45 | 40 | 40 | 40 | 40 |
| After-addition component | | | | | | |
| Oxazoline derivative*7) k-2020E | 7.5 | 7.5 | 7.5 | 7.5 | 7.5 | 7.5 |
| Dibutyltin dilaurate aqueous dispersion | 5 | 5 | 5 | 5 | 5 | 5 |
| Mw of specific polymer (×10⁴) | 2.3 | 2.5 | 1.9 | 2.1 | 2.0 | 1.8 |

TABLE 5

| Example | 13 | 14 | 15 | 16 | 17 | 1* |
|---|---|---|---|---|---|---|
| Name of Composition Component (a) | m | n | o | p | q | r |
| Methyltrimethoxysilane | 65 | 65 | 65 | 65 | 65 | 65 |
| Dimethyldimethoxysilane | 35 | 35 | 35 | 35 | 35 | 35 |
| Component (b) | | | | | | |
| Silyl group-containing vinyl resin | | | | | | |
| (b1) | 65 | 80 | 120 | 280 | 280 | 50 |
| (b2) | | | | | | |
| (b3) | | | | | | |
| (d)Tris(ethylacetoacetate)-aluminum | 5 | 5 | 5 | 5 | 5 | 5 |
| Ion-exchanged water | 15 | 15 | 15 | 15 | 15 | 15 |
| Isopropyl alcohol | 35 | 24 | 30 | 50 | 50 | 40 |
| Methyl orthoformate | | | | | 10 | |
| After-addition component | | | | | | |
| Oxazoline derivative*7) k-2020E | 7.5 | 7.5 | 7.5 | 1.0 | 1.0 | |
| Adipic acid hydrazide (10% solution) | | | | 6 | 6 | |
| N-β(Aminoethyl)γ-aminopropyldimethyldimethoxysilane | | | | | | 7.5 |
| Dibutyltin dilaurate aqueous dispersion | 5 | 5 | 5 | 5 | 5 | 5 |
| Mw of specific polymer (×10⁴) | 2.1 | 2.2 | 2.5 | 2.8 | 1.9 | 2.0 |

EXAMPLES 18 TO 38

Comparative Example 2

Each undercoating composition was applied onto an inorganic ceramic substrate so as to give a dry film thickness of 30 μm according to the formulation shown in Tables 6 and 7. Then, each composition of the invention (or for comparison) was applied thereon so as to give a dry film thickness of 30 μm to obtain a hardened film of the invention. The hardened film was thereafter dried at 80° C. for 5 minutes, followed by standing at room temperature for one day. Then, the initial hardness, the initial adhesion and the initial water resistance were evaluated. The chemical resistance, the weather resistance and the hot water resistance were further evaluated. These results are shown together in Tables 6 and 7.

TABLE 6

| Example | 18 | 19 | 20 | 21 | 22 | 23 | 24 | 25 | 26 | 27 | 28 |
|---|---|---|---|---|---|---|---|---|---|---|---|
| Overcoat | a | b | c | d | e | f | g | h | i | j | k |
| Undercoat | I | I | I | I | I | I | I | I | I | I | I |
| Initial adhesion | ○ | ○ | ○ | ○ | ○ | ○ | ○ | ○ | ○ | ○ | ○ |
| Initial hardness | B | B | B | B | B | B | B | B | B | B | B |
| Water resistance | ○ | ○ | ○ | ○ | ○ | ○ | ○ | ○ | ○ | ○ | ○ |
| Chemical resistance | ○ | ○ | ○ | ○ | ○ | ○ | ○ | ○ | ○ | ○ | ○ |
| Weather resistance | ⊚ | ⊚ | ⊚ | ⊚ | ⊚ | ⊚ | ⊚ | ⊚ | ⊚ | ⊚ | ⊚ |
| Hot water resistance | ○ | ○ | ○ | ○ | ○ | ○ | ○ | ○ | ○ | ○ | ○ |

TABLE 7

| Example | 29 | 30 | 31 | 32 | 33 | 34 | 35 | 36 | 37 | 38 | 2* |
|---|---|---|---|---|---|---|---|---|---|---|---|
| Overcoat | l | m | n | o | p | q | a | a | a | a | r |
| Undercoat | I | I | I | I | I | I | II | III | IV | V | VI |
| Initial adhesion | ○ | ○ | ○ | ○ | ○ | ○ | ○ | ○ | ○ | ○ | ○ |
| Initial hardness | B | B | B | B | B | B | B | B | B | B | <6B |
| Water resistance | ○ | ○ | ○ | ○ | ○ | ○ | ○ | ○ | ○ | ○ | X |
| Chemical resistance | ○ | ○ | ○ | ○ | ○ | ○ | ○ | ○ | ○ | ○ | ○ |
| Weather resistance | ⊚ | ⊚ | ⊚ | ⊚ | ⊚ | ⊚ | ⊚ | ⊚ | ⊚ | ⊚ | ○ |
| Hot water resistance | ○ | ○ | ○ | ○ | ○ | ○ | ○ | ○ | ○ | ○ | ○ |

EXAMPLES 39 AND 40

In 100 parts of the emulsion (solid concentration: 35%) before mixing of the after-addition component in Example 1, 30 parts of a crosslinked polymethyl methacrylate resin having a particle size distribution ranging from 30 μm to 100 μm was dispersed, and stirred at 2,000 rpm to obtain an aqueous dispersion having a solid concentration of 50%. To this aqueous dispersion, 7.5 parts of oxazoline derivative (oxazoline group-containing polystyrene polymer) k-2020E (a 40% solution) and 1 part of N-β(aminoethyl) γ-aminopropylmethyldimethoxysilane were added to obtain composition (a2) of the invention.

Similarly, using the emulsion before mixing of the after-addition component in Example 7, composition (g2) of the invention was obtained.

Using compositions (a2) and (g2) thus obtained, hardened films of the invention were obtained and evaluated in the same manner as with Example 18 with the exception that the formulation shown Table 8 was used. Results of the evaluation are shown together in Table 8.

EXAMPLES 41 AND 42

In 100 parts of the emulsion (solid concentration: 35%) before mixing of the after-addition component in Example 1, 30 parts of SiO$_2$ particles having an average particle size of 50 μm were dispersed, and stirred at 2,000 rpm to obtain an aqueous dispersion having a solid concentration of 50%. To this aqueous dispersion, 7.5 parts of oxazoline derivative (oxazoline group-containing polystyrene polymer) k-2020E (a 40% solution) and 1 part of N-β(aminoethyl) γ-aminopropylmethyldimethoxysilane were added to obtain composition (a3) of the invention.

Similarly, using the emulsion before mixing of the after-addition component in Example 7, composition (g3) of the invention was obtained.

Using compositions (a3) and (g3) thus obtained, hardened films of the invention were obtained and evaluated in the same manner as with Example 18 with the exception that the formulation shown Table 8 was used. Results of the evaluation are shown together in Table 8.

EXAMPLES 43 AND 44

A mill base comprising 25 g of a pigment, 25 parts of isopropyl alcohol, 0.5 part of a cellulose thickener and 0.5 part of a pigment dispersing agent was mixed with 100 parts of the emulsion (solid concentration: 35%) before mixing of the after-addition component in Example 1, and the resulting mixture was stirred in a sand mill for 30 minutes. Then, 7.5 parts of oxazoline derivative (oxazoline group-containing polystyrene polymer) k-2020E (a 40% solution) and 1 part of N-β(aminoethyl) γ-aminopropylmethyldimethoxysilane were added to obtain composition (a4) of the invention.

Similarly, using the emulsion before mixing of the after-addition component in Example 7, composition (g4) of the invention was obtained.

Using compositions (a4) and (g4) thus obtained, hardened films of the invention were obtained and evaluated in the same manner as with Example 18 with the exception that the compositions were applied so as to give overcoat layers having a dry film thickness of 50 μm according to the formulation shown Table 8. Results of the evaluation are shown together in Table 8.

TABLE 8

| Example | 39 | 40 | 41 | 42 | 43 | 44 |
|---|---|---|---|---|---|---|
| Overcoat | a2 | g2 | a3 | g3 | a4 | g4 |
| Intermediate coat | — | — | — | — | — | — |
| Undercoat | I | I | I | I | VII | VII |
| Initial adhesion | ○ | ○ | ○ | ○ | ○ | ○ |
| Initial hardness | HB | HB | HB | HB | HB | HB |
| Water resistance | ○ | ○ | ○ | ○ | ○ | ○ |
| Chemical resistance | ○ | ○ | ○ | ○ | ○ | ○ |
| Weather resistance | ⊚ | ⊚ | ⊚ | ⊚ | ⊚ | ⊚ |
| Hot water resistance | ○ | ○ | ○ | ○ | ○ | ○ |

What is claimed is:

1. A coating composition, comprising:
   (A) a polymer comprising units of the following:
      (a)(1) a hydrolysate of an organosilane represented by the formula:

$R^1{}_n Si(OR^2)_{4-n}$, wherein $R^1$ represents an organic group having 1 to 8 carbon atoms;
      wherein $R^2$ represents an alkyl group having 1 to 5 carbon atoms or an acyl group having 1 to 6 carbon atoms; and
      wherein n is an integer of from 0 to 2; or
      (a)(2) a condensation product thereof; or
      (a)(3) a combination of said organosilane and said condensation product; and
      (b) a vinyl polymer containing a silyl group having a silicon atom bound to a hydrolytic group, a hydroxyl group or both; and
   (B) an oxazoline derivative as a crosslinking agent; and
   (C) at least one of an organic metal compound, a β-keto compound, or a multifunctional hydrazine compound; wherein said coating composition is in the form of an aqueous dispersion.

2. The coating composition according to claim 1, wherein said hydrolysate of said organosilane of (a) is a mixture of (1) a compound represented by the formula $$CH_3Si(OR^2)_3$$

wherein $R^2$ represents an alkyl group having 1 to 5 carbon atoms or an acyl group having 1 to 6 carbon atoms; and (2) a compound represented by the formula $$R^1Si(OR^2)_3$$

wherein $R^1$ represents an organic group having 2 to 8 carbon atoms; and wherein $R^2$ represents an alkyl group having 1 to 5 carbon atoms or an acyl group having 1 to 6 carbon atoms; and wherein a content of the compound represented by $CH_3Si(OR^2)_3$ in said mixture is from 40% to 100% by weight.

3. The coating composition according to claim 2, wherein the content of the compound represented by $CH_3Si(OR^2)_3$ in said mixture is from 50% to 100% by weight.

4. The coating composition according to claim 1, wherein said vinyl polymer (b) has at least two or more silyl groups at its terminals or in side chains of a molecular chain thereof, wherein said silyl groups each have a silicon atom bound to a hydrolytic group, a hydroxyl group or both.

5. The coating composition according to claim 1, wherein said vinyl polymer (b) has a functional group which is chemically bound to a hydrophilic functional group, an oxazoline group or both.

6. The coating composition according to claim 1, wherein said oxazoline derivative is a copolymer obtained by emulsion polymerization or suspension polymerization of a copolymerizable oxazoline monomer and another monomer copolymerizable with said oxazoline monomer.

7. The coating composition according to claim 1, wherein an average particle size of said oxazoline derivative is from 0.01 μm to 0.5 μm.

8. A hardened film obtained by coating a substrate with the coating composition according to claim 1 and hardening the coating composition.

9. The coating composition according to claim 1, wherein said organic metal compound is a chelate compound of a metal selected from the group consisting of zirconium, titanium and aluminum.

10. The coating composition according to claim 1, wherein said organic metal compound is represented by a compound of formula $Zr(OR^5)_p(R^6COCHCOR^7)_{4-p}$, or a compound of formula $Ti(OR^5)_q(R^6COCHCOR^7)_{4-q}$, or a compound of formula $Al(OR^5)_r(R^6COCHCOR^7)_{3-r}$;

wherein $R^5$ and $R^6$ each independently represent monovalent hydrocarbon groups each having from 1 to 6 carbon atoms;

wherein $R^7$ represents an alkoxy group having from 1 to 16 carbon atoms or a monovalent hydrocarbon group having from 1 to 6 carbon atoms;

wherein p and q are each integers of from 0 to 4; and wherein r is an integer of from 0 to 3.

11. The coating composition according to claim 1, further comprising a compound selected from the group consisting of tri-n-butoxy.ethylacetoacetate zirconium, di-i-propoxy bis(acetylacetonato)titanium, di-i-propoxy.ethylacetoacetate aluminum, tris(ethylacetoacetate)aluminum and a mixture thereof.

12. The coating composition according to claim 1, wherein said organic metal compound is used in an amount of from 0.01 to 50 parts by weight, based on 100 parts by weight of said polymer (A).

13. The coating composition according to claim 1, wherein said β-keto compound is a β-diketone, a β-ketoester or a mixture thereof.

14. The coating composition according to claim 1, wherein said β-keto compound is represented by formula $$R^6COCH_2COR^7$$

wherein $R^6$ represents a monovalent hydrocarbon group each having from 1 to 6 carbon atoms; and wherein $R^7$ represents an alkoxy group having from 1 to 16 carbon atoms or a monovalent hydrocarbon group having from 1 to 6 carbon atoms.

15. The coating composition according to claim 1, wherein said multifunctional hydrazine compound has two or more hydrazino groups.

16. The coating composition according to claim 1, wherein said multifunctional hydrazine compound is a dicarboxylic acid dihydrazide having 2 to 10 carbon atoms, a hydrazide having three or more hydrazide groups or an aliphatic dihydrazine having 2 to 4 carbon atoms.

17. The coating composition according to claim 1, further comprising adipic acid dihydrazide, sebacic acid dihydrazide, isophthalic acid dihydrazide, dihydrazidediacetonehydrazone adipate and mixtures thereof.

* * * * *